United States Patent
Ishikawa et al.

(10) Patent No.: US 9,132,572 B2
(45) Date of Patent: Sep. 15, 2015

(54) ELECTRIC TOOL WITH DUST COLLECTOR

(75) Inventors: Yoshiaki Ishikawa, Anjo (JP);
Kiyonobu Yoshikane, Anjo (JP);
Yoshitaka Machida, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 1049 days.

(21) Appl. No.: 13/188,954

(22) Filed: Jul. 22, 2011

(65) Prior Publication Data

US 2012/0043101 A1  Feb. 23, 2012

(30) Foreign Application Priority Data

Aug. 20, 2010 (JP) ................................. 2010-185348

(51) Int. Cl.
B25D 17/14 (2006.01)
B28D 7/02 (2006.01)

(52) U.S. Cl.
CPC ........................................ B28D 7/02 (2013.01)

(58) Field of Classification Search
CPC .................................................... B25D 17/14
USPC ........ 173/198, 75, 217, 197, 97, 171; 408/58; 55/418
See application file for complete search history.

(56) References Cited

U.S. PATENT DOCUMENTS

| | | | |
|---|---|---|---|
| 6,840,335 B1 * | 1/2005 | Wu | 173/217 |
| 7,017,680 B2 * | 3/2006 | Arich et al. | 173/198 |
| 7,354,226 B2 * | 4/2008 | Britz | 408/67 |
| 7,909,114 B2 | 3/2011 | Nishikawa et al. | |
| 2004/0251041 A1 * | 12/2004 | Grossman | 173/217 |
| 2005/0281627 A1 | 12/2005 | Britz | |
| 2009/0180829 A1 * | 7/2009 | Rejman et al. | 403/331 |

FOREIGN PATENT DOCUMENTS

| | | |
|---|---|---|
| EP | 1 459 841 A1 | 9/2004 |
| EP | 1 964 649 A2 | 9/2008 |
| GB | 2 417 978 A | 3/2006 |
| JP | A-9-1477 | 1/1997 |
| JP | A-2002-219672 | 8/2002 |
| JP | A-2002-307332 | 10/2002 |
| JP | A-2008-207360 | 9/2008 |

OTHER PUBLICATIONS

Aug. 6, 2012 Office Action issued in European Patent Application No. 11175943.7.
Jan. 14, 2014 Office Action issued in Japanese Patent Application No. 2010-185348 (with English translation).
Jul. 22, 2014 Office Action issued in European Application No. 11 175 943.7.

* cited by examiner

*Primary Examiner* — Nathaniel Chukwurah
(74) *Attorney, Agent, or Firm* — Oliff PLC

(57) ABSTRACT

A hammer drill includes a dust collector engaged with a housing by sliding. An engagement protrusion, which can engage and disengage with a rear engagement recessed portion provided on a guide groove of the housing, is provided at a position where the dust collector engages with the housing and biased in the direction of engagement with the rear engagement recessed portion. A front engagement recessed portion is also provided on the guide groove, and can engage with the engagement protrusion at a slide position of the dust collector in front of the engagement position. By engaging the engagement protrusion with the front engagement recessed portion, the dust collector can be fixed to the housing even at the slide position.

22 Claims, 7 Drawing Sheets

ELECTRIC TOOL WITH DUST COLLECTOR

BACKGROUND OF THE INVENTION

This application claims the benefit of Japanese Patent Application Number 2010-185346 filed on Aug. 20, 2010, the entirety of which is incorporated by reference.

TECHNICAL FIELD

The present invention relates to an electric tool such as, for example, an electric drill or a hammer drill, to which a dust collector is mounted as an attachment.

BACKGROUND ART

An electric tool such as an electric drill or a hammer drill may have a dust collector mounted as an attachment, which collects and recovers powder dust generated from a processed material during boring work or the like. As this type of electric tool with a dust collector, Japanese Patent Application Publication No. JP-A-2008-207360, for example, describes an invention that provides a housing for dust collection in a housing of a hammer drill that is an electric tool. The housing for dust collection is in communication with a dust collection fan that is provided on a rotation shaft of a motor. A dust collection case is detachably mounted to an opening of the housing for dust collection, and engagement portions are provided on diagonals of the dust collection case. A sliding engagement is known as a mounting structure for this type of dust collector, wherein the dust collector linearly slides against the electric tool using a rail or the like such that an engaging portion provided on one end of such sliding engages and locks with an engaged portion provided on the other end.

In the sliding engagement described above, the dust collector may be used without surely sliding the dust collector to the engagement position. In such case, there is a risk of the dust collector detaching and falling, and becoming damaged as a result.

SUMMARY OF THE INVENTION

Hence, the present invention provides an electric tool with a dust collector, which can suitably prevent damage caused by the dust collector falling even when sliding engagement of the dust collector is incomplete.

To achieve the above, according to a first aspect of an electric tool with a dust collector of the present invention, the dust collector is in sliding engagement with a housing at a predetermined position. An engaging portion is provided on one of the housing and the dust collector, engageable and disengageable with an engaged portion provided on the other of the housing and the dust collector at an engagement position of the dust collector, and biased in a direction of engagement with the engaged portion. The dust collector is fixed by engaging the engaging portion with the engaged portion. A second engaged portion is provided on the other of the housing and the dust collector, and engageable with the engaging portion at at least one slide position of the dust collector in front of the engagement position. The dust collector can be fixed to the housing even at the slide position by engaging the engaging portion with the second engaged portion.

To achieve the above, according to a second aspect of the electric tool with a dust collector of the present invention, the dust collector is in sliding engagement with a housing at a predetermined position. An engaging portion is provided on one of the housing and the dust collector, engageable and disengageable with an engaged portion provided on the other of the housing and the dust collector at an engagement position of the dust collector, and biased in a direction of engagement with the engaged portion. The dust collector is fixed by engaging the engaging portion with the engaged portion. A second engaging portion is provided on the one of the housing and the dust collector, and engageable with the engaged portion at at least one slide position of the dust collector in front of the engagement position. The dust collector can be fixed to the housing even at the slide position by engaging the second engaging portion with the engaged portion.

To achieve the above, according to a third aspect of the electric tool with a dust collector of the present invention, the dust collector is in sliding engagement with a housing at a predetermined position. An engaging portion is provided on one of the housing and the dust collector, engageable and disengageable with an engaged portion provided on the other of the housing and the dust collector at an engagement position of the dust collector, and biased in a direction of engagement with the engaged portion. The dust collector is fixed by engaging the engaging portion with the engaged portion. A second engaging portion is provided on one of the housing and the dust collector, engageable and disengageable with a second engaged portion provided on the other of the housing and the dust collector at at least one slide position of the dust collector in front of the engagement position. The dust collector can be fixed to the housing even at the slide position by engaging the second engaging portion with the second engaged portion.

According to a fourth aspect of the present invention, in the electric tool with a dust collector having a configuration based on any one of the first to third aspects, a power terminal is provided on each of the housing and the dust collector, with the power terminals separated from each other at the slide position, and electrically connected to each other at the engagement position so as to supply power from the electric tool side to the dust collector.

Moreover, in the first aspect of the present invention, the engaged portion and the second engaged portion may be provided on the housing, and the engaging portion may be provided on the dust collector. The engaged portion and the second engaged portion may be two, front and rear, engagement recessed portions formed within a guide groove that is formed on a lower surface of the housing in a sliding engagement direction, such that respective groove widths of the two engagement recessed portions widen toward one side. A rear surface of the front engagement recessed portion is inclined so as to narrow a groove widths toward rearward. The engaging portion may be an engagement protrusion that runs through a laterally long hole formed on an upper surface of the dust collector and projects upward. Further, the engaging portion is positioned within the guide groove at the engagement position and biased toward a side on which the engagement recessed portion is formed.

According to the first to third aspects of the present invention, the dust collector does not detach from the electric tool even when sliding engagement of the dust collector is incomplete. Thus, damage caused by the dust collector falling can be suitably prevented.

According to the fourth aspect of the present invention, in addition to the effect of the first to third aspects, there is no risk of the dust collector operating while sliding engagement of the dust collector is incomplete.

BRIEF DESCRIPTION OF THE DRAWINGS

The above and other aspects, other advantages and further features of the present invention will become more apparent

FIGS. 4A and 4B are explanatory diagrams that show positions of an engagement protrusion within a guide groove, wherein FIG. 4A shows an engagement position and FIG. 4B shows a slide position in front of the engagement position.

FIGS. 6A and 6B are explanatory diagrams that show modification examples of an engaging portion and an engaged portion, wherein FIG. 6A shows an engagement position and FIG. 6B shows a slide position.

FIGS. 7A and 7B are explanatory diagrams that show modification examples of the engaging portion and the engaged portion, wherein FIG. 7A shows the engagement position and FIG. 7B shows the slide position.

DETAILED DESCRIPTION OF THE EMBODIMENTS

Hereinafter, embodiments of the present invention will be described on the basis of the drawings.

Figure 1:
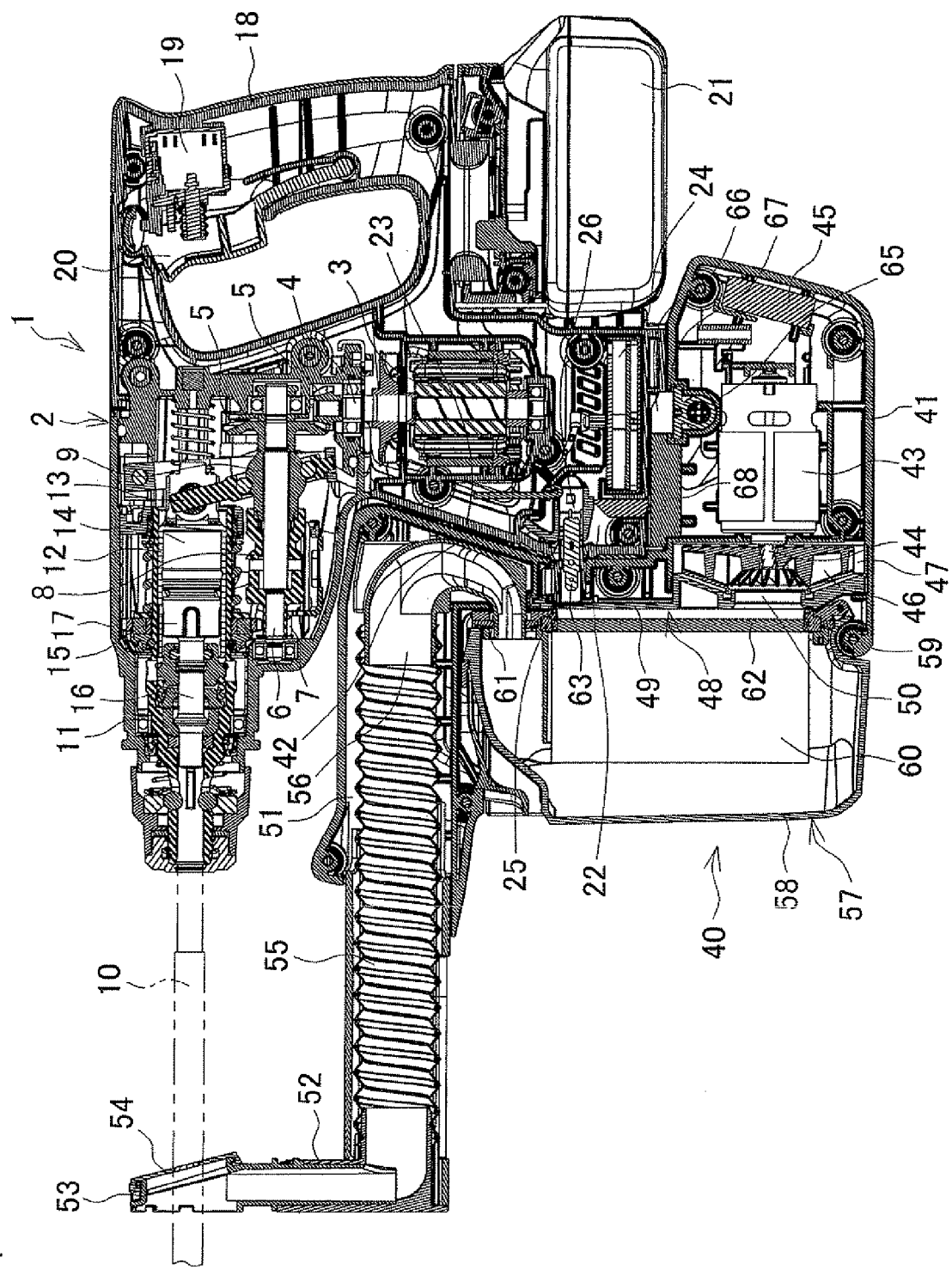
FIG. 1 is a vertical cross-sectional view of a hammer drill with a dust collector.

FIG. 1 shows an example in which a hammer drill that is an electric tool is engaged with a dust collector. In a hammer drill 1, a housing 2 is formed by assembling together a pair of left and right half housings. A front lower part of the housing 2 (note that leftward in FIG. 1 corresponds to the forward direction) accommodates a motor 3 with an output shaft 4 facing upward. Above the motor 3, an intermediate shaft 6 to which torque is transmitted through bevel gears 5, 5, includes a first gear 7, a clutch 8, and a boss sleeve 9 in that order from the front. Above the intermediate shaft 6, a tool holder 11 whose distal end is insertably mounted with a bit 10 is axially supported parallel to the intermediate shaft 6. A piston cylinder 12 is accommodated with play behind the tool holder 11. An arm 13 mounted to the boss sleeve 9 through a swash bearing is connected to a rear end of the piston cylinder 12. Inside the piston cylinder 12, a striker 15 is mounted longitudinally movable through an air chamber 14 and can strike an impact bolt 16, which is provided in front of the striker 15. The first gear 7 meshes with a second gear 17 that is attached to the tool holder 11.

Meanwhile, a rear upper part of the housing 2 is formed with a handle 18 that includes a switch 19 and a switch lever 20. A battery pack 21 that serves as a power source is mounted below the handle 18. The front lower part of the housing 2 is a mount unit 22 whose front surface is an inclined surface portion 23. The mount unit 22 projects in front of the battery pack 21, and is connected to a dust collector 40. A controller 24 is accommodated inside the mount unit 22, and electrically connects a coil of the motor 3, the switch 19, and the battery pack 21 through lead wires not shown in the drawing. A positive/negative female terminal 26, which is a power terminal electrically connected to the controller 24 by a lead wire not shown in the drawing, is provided behind an insertion opening 25 that is provided in the inclined surface portion 23.

Figure 2:
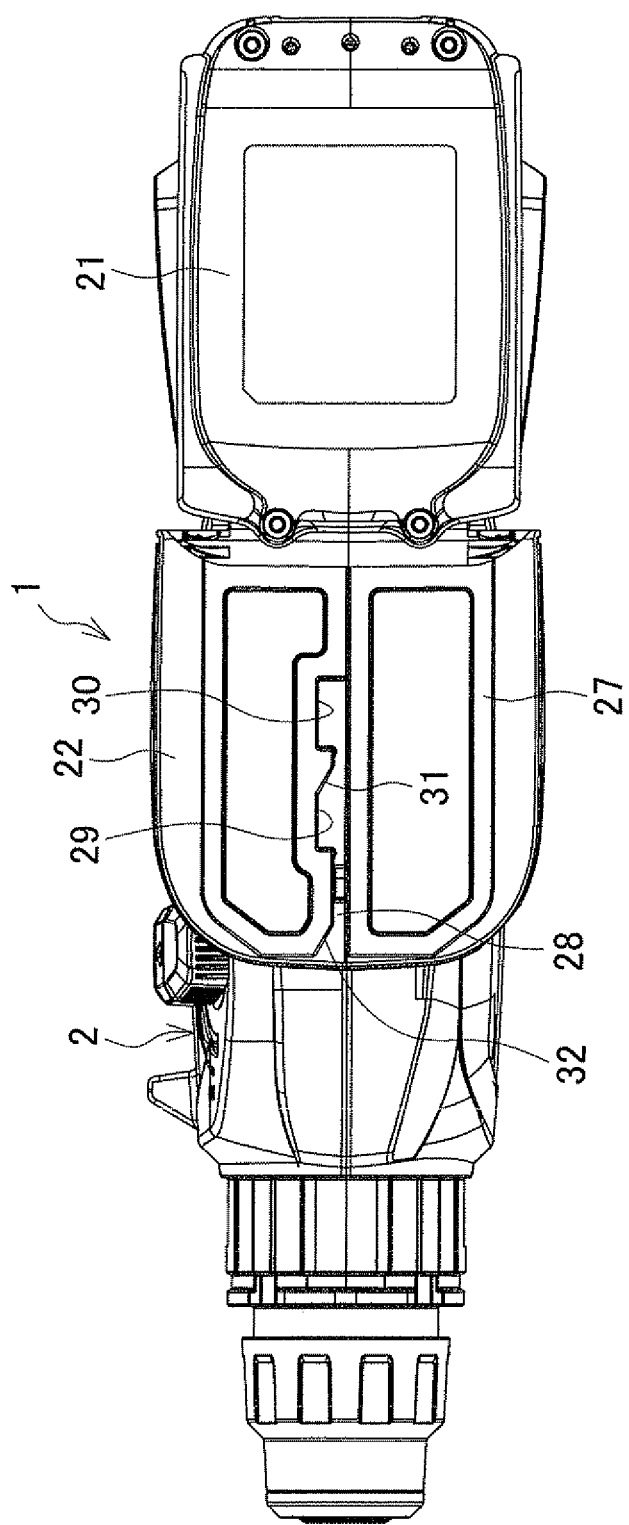
FIG. 2 is a bottom view of the hammer drill.
Figure 3:
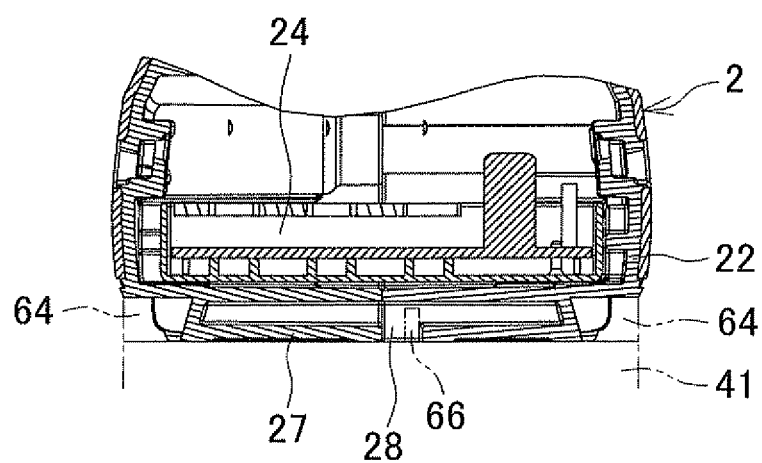
FIG. 3 is a transverse cross-sectional view of a lower section of a mount unit.

As shown in FIGS. 2 and 3, a lower surface of the mount unit 22 is formed with a rail 27 that is a tapered surface whose left and right surfaces widen downward. A guide groove 28 whose front end and lower surface are open is longitudinally formed at a generally lateral center of the rail 27 interior. A front engagement recessed portion 29 and a rear engagement recessed portion 30 are formed at a predetermined interval at two locations, i.e., a rear end and a location in front of the rear end, on a left surface of the guide groove 28. The groove width of the front engagement recessed portion 29 and the rear engagement recessed portion 30 widens leftward. A rear surface of the front engagement recessed portion 29 is formed as an inclined surface 31 and the width of the groove thereof narrows rearward. Likewise, an inclined surface 32 whose groove width widens forward is formed on a left surface at the front end of the guide groove 28. The rear engagement recessed portion 30 is an engaged portion, and the front engagement recessed portion 29 is a second engaged portion.

The dust collector 40 includes a casing 41 that is formed from assembling together left and right half casings. A rear upper part of the casing 41 forms a mating recessed portion 42 that contacts and fits with a lower surface and the inclined surface portion 23 of the mount unit 22 of the hammer drill 1. A motor 43 that has an output shaft 44 facing forward is transversely accommodated at a rear of the casing 41, and a controller 45 is provided behind the motor 43. A dust collection fan 46 is fixedly attached to the output shaft 44 and accommodated within an intake air chamber 47. The intake air chamber is in the casing 41 and includes an exhaust port not shown in the drawing. Reference numeral 48 denotes an engagement portion that engages with a dust box 57, described later, in front of the intake air chamber 47. The engagement portion is in a recessed shape where the recessed portion opens forward. A partition 49 that serves as the bottom of the engagement portion 48 includes a through hole 50 that is coaxial with the dust collection fan 46 and communicates the engagement portion 48 with the intake air chamber 47.

A guide passage 51 is longitudinally formed above the engagement portion 48, and has an open front end and a rear end that bends in a U-shape to wrap around toward the rear of the engagement portion 48. The front end of the guide passage 51 is connected to an L-shaped nozzle 52, and a distal end of the nozzle 52 projects upward and has a cylindrical suction unit 53 that opens forward and rearward. A rear part of the suction unit 53 is diagonally cut so as to axially shorten upward. A cap 54 through which the bit 10 runs is fittedly attached to the opening of the rear part of the suction unit 53.

A flexible hose 55 is accommodated within the guide passage 51. A front end of the flexible hose 55 is connected to the nozzle 52, and a rear end of the flexible hose 55 is connected to a duct 56. The duct 56 has a square cylindrical shape that bends in a U-shape so as to follow the rear end shape of the guide groove 51. A distal end part of the duct 56 runs through the partition 49 and projects inside the engagement portion 48. The dust box 57 includes a filter unit 60 on a lid body 59 that is hinged to a box main body 58. When the dust box 57 is mounted to the engagement portion 48, the distal end part of the duct 56 runs through an inlet 61 provided in the lid body 59 and an outlet 62 faces the through hole 50.

A positive/negative male terminal 63, which is a power terminal electrically connected to the female terminal 26 through the insertion opening 25 when the dust collector 40 is mounted to the mount unit 22, is also provided behind the engagement portion 48.

An upper surface of the rear part of the casing 41 that forms the mating recessed portion 42 is provided with a pair of left and right guides 64, 64 (see FIGS. 3 and 5) that extend in the longitudinal direction. The pair of left and right guides 64, 64 fits with the rail 27 that is provided on the lower surface of the mount unit 22 at the position where the dust collector 40 engages with the mount unit 22. That is, with this structure, by positioning the rail 27 between the guides 64, 64 and sliding the casing 41 rearward with respect to the mount unit 22, the casing 41 is guided to the engagement position at which the mount unit 22 fits with the mating recessed portion 42.

Meanwhile, a shaft-like slider 65 slidable in the lateral direction is provided within the casing 41. An engagement protrusion 66 serves as an engaging portion that is projectingly provided on an upper surface of the slider 65. The engagement protrusion 66 runs through a laterally long hole 67 provided on the upper surface of the rear part of the casing 41, and projects between the guides 64, 64. In addition, the engagement protrusion 66 is positioned at the rear end of the guide groove 28, which is provided on the rail 27 at the engagement position of the dust collector 40. However, the slider 65 is biased leftward by a coil spring that is not shown in the drawing within the casing 41, and the engagement protrusion 66 thus engages with the rear engagement recessed portion 30 on a left end of the long hole 67. By sliding the slider 65 rightward against the biasing of the coil spring, the engagement protrusion 66 becomes positioned on a right end of the long hole 67 and can longitudinally pass through the guide groove 28 interior. Reference numeral 68 denotes a guide plate that is provided longitudinally upright in front of the engagement protrusion 66 on the upper surface of the rear part of the casing 41. When the engagement protrusion 66 is positioned on the right end of the long hole 67, the guide plate 68 can pass through the guide groove 28 interior together with the engagement protrusion 66 in a longitudinally continuous configuration.

Figure 4A:
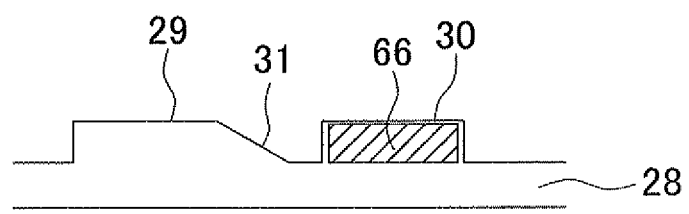

In the hammer drill 1 configured as described above, to mount the dust collector 40 to the hammer drill 1, the rail 27 of the hammer drill 1 and the guides 64, 64 of the dust collector 40 are aligned. In this state, the dust collector 40 is slid rearward so as to fit the mount unit 22 with the mating recessed portion 42 from the front. Thus, the engagement protrusion 66 first contacts the inclined surface 32 on the front end of the guide groove 28, whereby the engagement protrusion 66 is guided toward the center along the inclined surface 32 against the biasing of the coil spring, and continues to slide rearward into the guide groove 28. Further, sliding the dust collector 40 engages the engagement protrusion 66 with the front engagement recessed portion 29. However, the guidance of the inclined surface 31 on the rear surface of the guide groove 28 causes the engagement protrusion 66 to separate from the front engagement recessed portion 29 and engage with the rear engagement recessed portion 30 as shown in FIG. 4A. At such time, as shown in FIG. 1, the male terminal 63 of the dust collector 40 advances from the insertion opening 25 into the housing 2, and is inserted and electrically connected to the female terminal 26.

At this engagement position, turning on the switch 19 by pressing the switch lever 20 of the hammer drill 1 drives the motor 3 to rotate the intermediate shaft 6. Sliding the clutch 8 from outside the housing 2 at this time selects any one of the following: a forward position at which only the first gear 7 is engaged, a reverse position at which only the boss sleeve 9 is engaged, and an intermediate position at which the first gear 7 and the boss sleeve 9 are simultaneously engaged. By selecting one of these positions, a drill mode, a hammer mode, and a hammer drill mode can be selected. In the drill mode, the tool holder 11 is rotated through the second gear 17 to rotate the bit 10. In the hammer mode, the piston ring 12 is reciprocated by oscillation of the arm 13, and the striker 15 impacts the bit 10 through the impact bolt 16 in association with the motion of the piston ring 12. In the hammer drill mode, the rotation of the tool holder 11 and the striking of the impact bolt 16 are performed at the same time.

Meanwhile, once the switch 19 is turned on, the controller 24 supplies power to the controller 45 of the dust collector 40. Accordingly, the controller 45 drives the motor 43 to rotate the dust collection fan 46. Thus, outside air is drawn in from the suction unit 53 of the nozzle 52 and passes through the flexible hose 55 and the duct 56. Such air is then discharged to inside the box main body 58 of the dust box 57 from the inlet 61. The air further passes through the filter unit 60 and ends up in the intake air chamber 47 via the outlet 62 and the through hole 50, after which the air is discharged to outside from the exhaust port provided in the intake air chamber 47. In this manner, powder dust generated from a processed material due to the rotation or the like of the bit 10 is suctioned into the suction unit 53, and advances to inside the box main body 58 via the nozzle 52, the flexible hose 55, and the duct 56. The powder dust is then captured by the filter unit 60 and accumulates within the box main body 58.

Since the rear part of the suction unit 53 is diagonally cut, air does not remain in the suction unit 53 and suctioned powder dust can be smoothly transferred downstream. Thus, the powder dust can be efficiently collected and does not stay in the suction unit 53.

If pressing of the switch lever 20 is stopped and the switch 19 is turned off, the motor 3 also stops, so that the rotation of the bit 10 stops. However, the controller 24 includes a delay function that delays stopping of the conduction of electricity to the dust collector 40 for several seconds after the switch 19 is turned off. Therefore, the dust collection fan 46 in the dust collector 40 continues to rotate for several seconds after the bit stops. Thus, powder dust remaining in the nozzle 52, the flexible hose 55, and the like can also be surely collected in the dust box 57.

The engagement protrusion 66 may not reach the rear engagement recessed portion 30 due to insufficient sliding of the dust collector 40 with respect to the hammer drill 1. In such case, when the hammer drill 1 is inclined downwards, the guide 64 slides forward against the rail 27 and the dust collector 40 moves because the dust collector 40 is not fixed to the hammer drill 1.

Figure 4B:
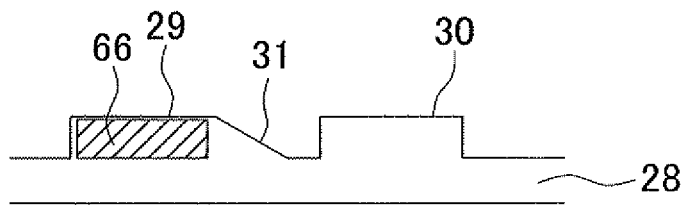
Figure 5:
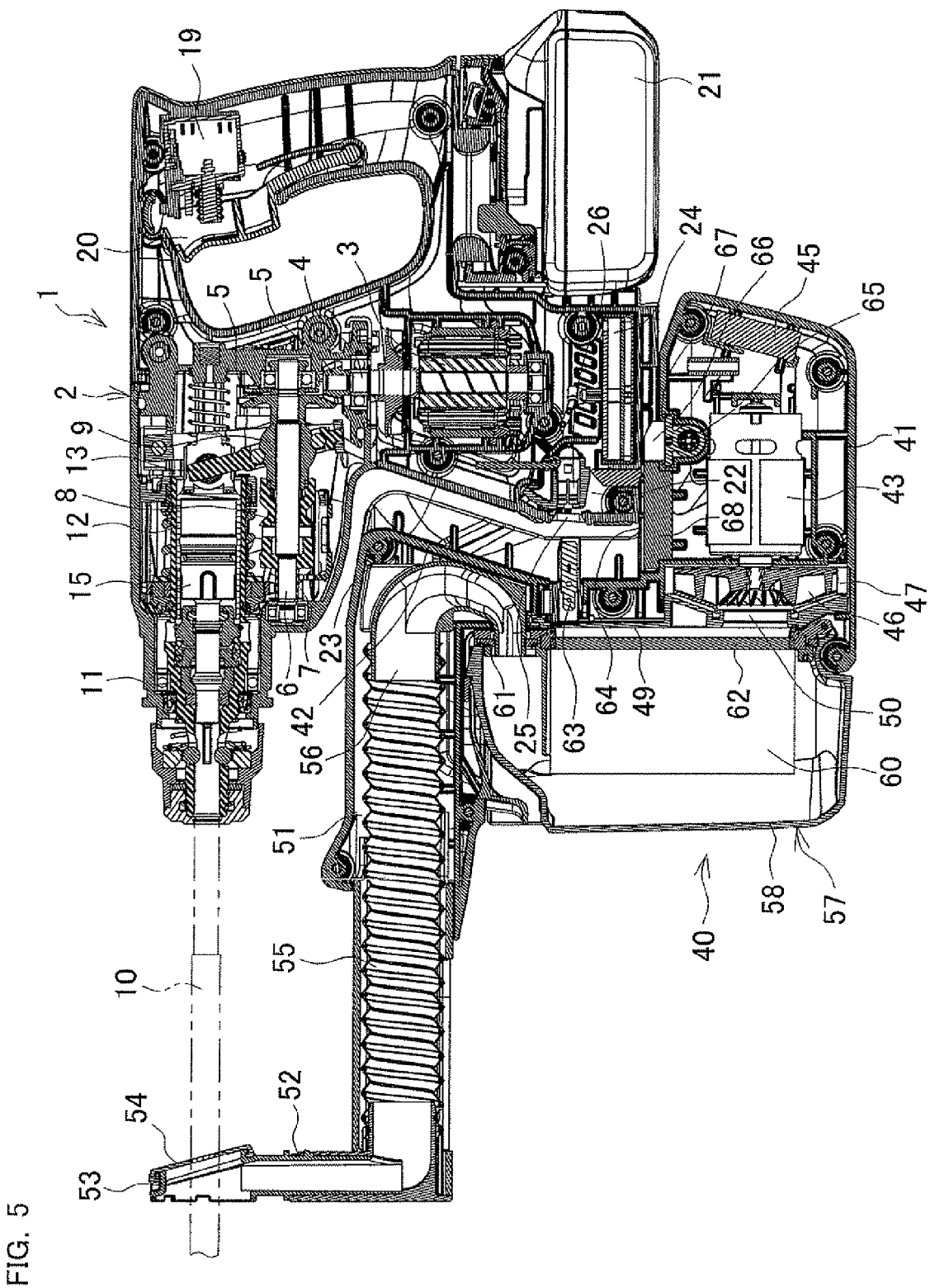
FIG. 5 is a vertical cross-sectional view of the hammer drill with the dust collector at a slide position.

However, at the slide position where the engagement protrusion 66 reaches the front engagement recessed portion 29, the engagement protrusion 66 engages with the front engagement recessed portion 29 as shown in FIG. 4B. Therefore, the dust collector 40 is restricted from sliding and does not detach from the hammer drill 1. It should be noted that, when the male terminal 63 separates from the female terminal 26 as shown in FIG. 5, the engagement protrusion 66 is engaged with the front engagement recessed portion 29, which terminates the electrical connection between the hammer drill 1 and the dust collector 40. Therefore, even if the switch 19 of the hammer drill 1 is turned on, power is not supplied to the dust collector 40.

To remove the dust collector 40, the slider 65 is slid rightward against the biasing of the coil spring to release engagement of the engagement protrusion 66 with the front engagement recessed portion 29 or the rear engagement recessed portion 30. In this state, opposite the direction for mounting, the dust collector 40 is slid forward from the hammer drill 1, whereby the dust collector 40 can be removed from the hammer drill 1.

According to the hammer drill 1 with the dust collector 40 of the embodiment described above, the housing 2 of the hammer drill 1 is provided with the front engagement recessed portion 29 that can engage with the engagement protrusion 66 at the slide position of the dust collector 40, which is a position in front of the engagement position. In addition, the dust collector 40 can be fixed to the housing 2 even at the slide position by the engagement protrusion 66 engaging with the front engagement recessed portion 29. Therefore, even if the sliding engagement of the dust collector 40 is incomplete, the dust collector 40 does not detach from the hammer drill 1. Thus, damage caused by the dust collector 40 falling can be suitably prevented.

Here, in particular, because the male terminal 63 separates from the female terminal 26 when the dust collector 40 is at the slide position, thereby cuts off the supply of power to the dust collector 40, there is no risk of the dust collector 40 operating while the sliding engagement of the dust collector 40 is incomplete.

It should be noted that, in the embodiment described above, one front engagement recessed portion that serves as the second engaged portion is provided to fix the dust collector at one slide position. However, two or more front engagement recessed portions may be provided to set a plurality of slide positions. In addition, the biasing direction of the slider and the side on which the engagement recessed portion is provided may be laterally reversed.

Further, the rail may be provided on the hammer drill and the guide provided on the dust collector or vice versa. The engaging portion and the engaged portion may also be reversely provided in the same manner.

Fixing of the dust collector at the slide position in front of the engagement position may be accomplished by another structure. Next, other embodiments will be described. Except for sections related to the engaging portion and the engaged portion, the structures of the hammer drill and the dust collector in the embodiments below are identical to those of the above embodiment. The following will thus focus on the structures of the engaging portion and the engaged portion, and omit duplicate descriptions.

Figure 6A:
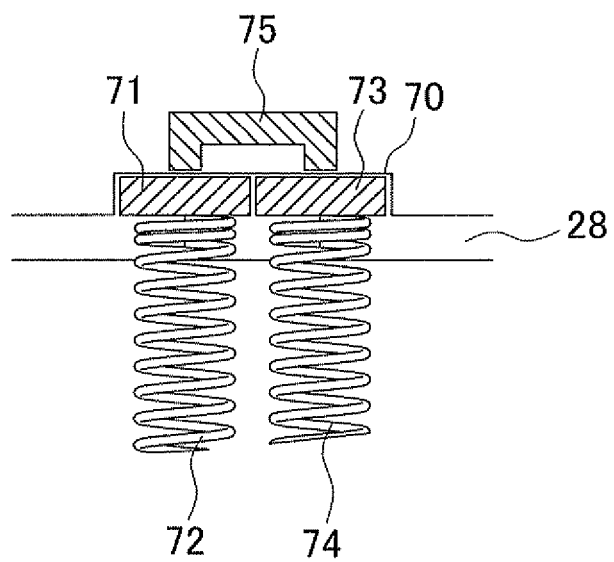

In the embodiment shown in FIG. 6A, an engagement recessed portion 70 that serves as the engaged portion is provided on the guide groove 28 on the housing 2 side, and an engagement protrusion 71 that serves as the engaging portion is provided on the dust collector 40. Biasing from a coil spring 72 causes the engagement protrusion 71 to engage with the engagement recessed portion 70 at the engagement position. In addition, a second engagement protrusion 73 that serves as a second engaging portion is further provided behind the engagement protrusion 71 of the dust collector 40. Biasing from a coil spring 74 presses the second engagement protrusion 73 toward the left surface of the guide groove 28. Reference numeral 75 denotes a two-pronged pressing plate that is connected to the slider 65 and used for simultaneously sliding the two engagement protrusions 71, 73 rightward against the biasing of the coil springs 72, 74.

Figure 6B:
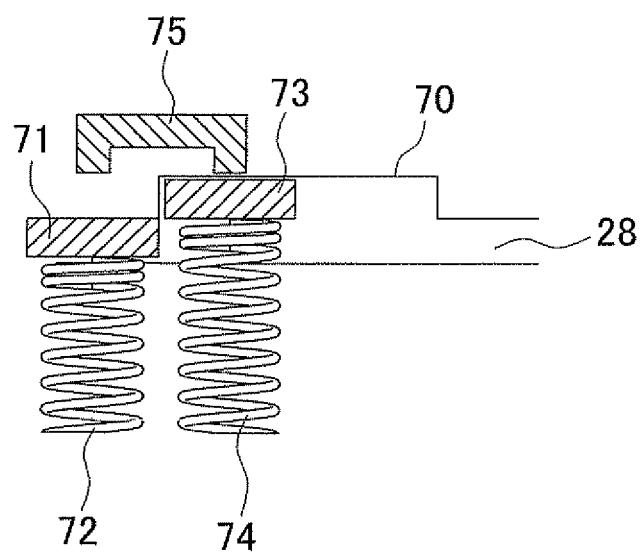

Therefore, in this embodiment as well, even if the engagement protrusion 71 does not engage with the engagement recessed portion 70 at the slide position in front of the engagement position, as shown in FIG. 6B, the second engagement protrusion 73 engages with the engagement recessed portion 70 and enables the dust collector 40 to be fixed to the housing 2 even at the slide position. Thus, damage caused by the dust collector 40 falling can be prevented.

Note that, also in this embodiment, two or more second engagement protrusions may be provided aligned in the sliding direction of the dust collector 40 to set a plurality of slide positions at which the dust collector 40 can be fixed.

Figure 7A:
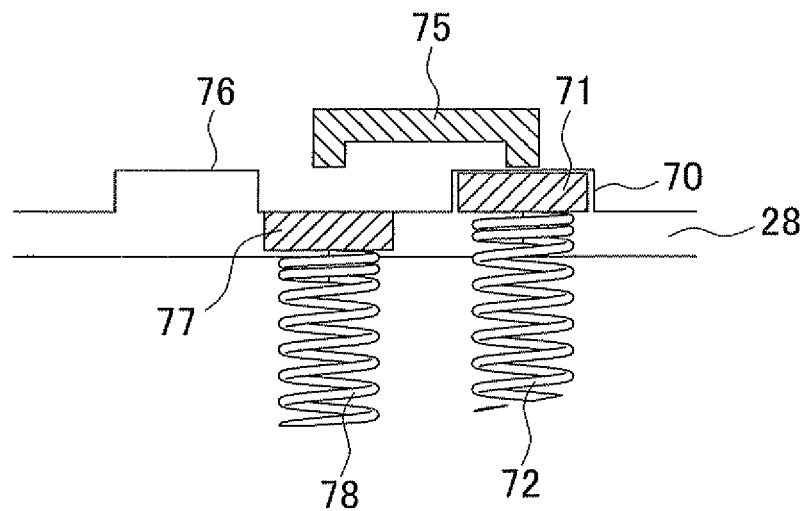

In the embodiment shown in FIG. 7A, the engagement recessed portion 70 that serves as the engaged portion is provided on the guide groove 28 on the housing 2 side, and an engagement protrusion 71 that serves as the engaging portion is provided on the dust collector 40. In addition, a second engagement recessed portion 76 that serves as a second engaged portion is further provided in front of the engagement recessed portion 70 of the housing 2, and a second engagement protrusion 77 that serves as a second engaging portion is provided in front of the engagement protrusion 71 of the dust collector 40. Biasing from a coil spring 78 engages the second engagement protrusion 77 with the second engagement recessed portion 76 at the slide position in front of the engagement position.

Figure 7B:
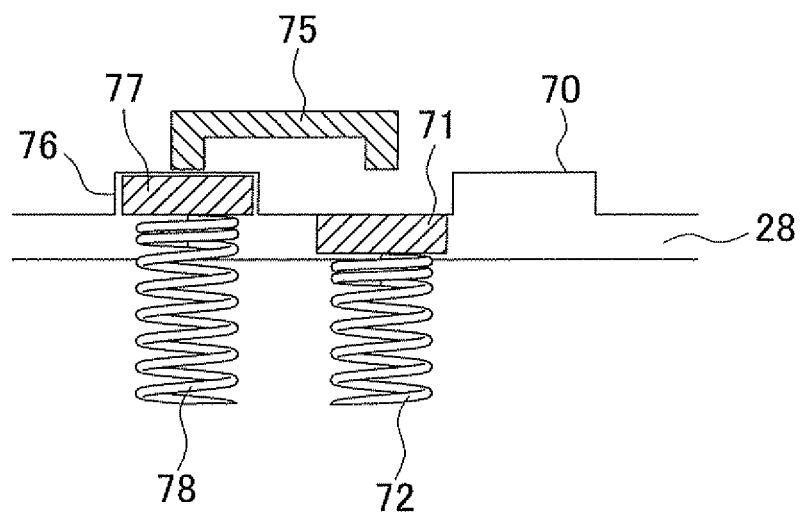

Therefore, in this embodiment as well, even if the engagement protrusion 71 does not engage with the engagement recessed portion 70 at the slide position in front of the engagement position, as shown in FIG. 7B, the second engagement protrusion 77 engages with the second engagement recessed portion 76 and enables the dust collector 40 to be fixed to the housing 2 even at the slide position. Thus, damage caused by the dust collector 40 falling can be prevented.

Note that, also in this embodiment, two or more second engagement recessed portions and second engagement protrusions may be provided aligned in the sliding direction of the dust collector 40 to set a plurality of slide positions at which the dust collector 40 can be fixed.

In addition, with regard to engagement and disengagement of the engaging portion and the engaged portion, the engagement protrusion in the embodiments described above is linearly moved to engage and disengage with the engagement recessed portion. However, for example, in an embodiment where a hook-shaped engagement protrusion is rotationally moved to engage and disengage with an engagement projection portion, a plurality of engagement projection portions may be provided, or a plurality of engagement protrusions may be provided at various positions with respect to one engagement projection portion, or separate groups of engagement protrusions and engagement projection portions that engage and disengage at at least one slide position may be provided. In this manner, the same operation and effects of the above embodiments can be obtained.

Further, the configuration of the dust collector is not limited to the embodiments described above, and various modifications may be made as appropriate. For example, the relationship of male terminal and the female terminal may be reversed, or these terminals may be omitted and a power source provided in the dust collector. The electric tool of the present invention is obviously not limited to a hammer drill, and the present invention may be applied to various other types of tools such as an electric drill and an electric hammer.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric tool with a dust collector, wherein the dust collector is in sliding engagement with a housing at a predetermined position, comprising:
   an engaging portion provided on one of the housing and the dust collector, engageable and disengageable with an engaged portion provided on the other of the housing and the dust collector at an engagement position of the dust collector, and biased in a direction of engagement with the engaged portion, with the dust collector fixed by engaging the engaging portion with the engaged portion; and a second engaged portion provided on the other of the housing and the dust collector, and engageable with the engaging portion at at least one slide position of the dust collector in front of the engagement position, wherein the dust collector is fixed to the housing even at the slide position by engaging the engaging portion with the second engaged portion, and wherein the engaging portion is engaged with the engaged portion and not the second engaged portion in the engagement position, and the engaging portion is engaged with the second engaged portion and not the engaged portion in the slide position.

2. The electric tool with a dust collector according to claim 1, wherein a power terminal is provided on each of the housing and the dust collector, with the power terminals separated from each other at the slide position, and electrically connected to each other at the engagement position so as to supply power from the electric tool side to the dust collector.

3. The electric tool with a dust collector according to claim 2, wherein the dust collector comprises a motor which drives using power supplied from the electric tool side, and which includes a dust collection fan on an output shaft.

4. The electric tool with a dust collector according to claim 1, wherein the engaged portion and the second engaged portion are provided on the housing, and the engaging portion is provided on the dust collector.

5. The electric tool with a dust collector according to claim 4, wherein the engaged portion and the second engaged portion are two, front and rear, engagement recessed portions formed within a guide groove that is formed on a lower surface of the housing in a sliding engagement direction, such that respective groove widths of the two engagement recessed portions widen toward one side.

6. The electric tool with a dust collector according to claim 5, wherein a rear surface of the front engagement recessed portion is inclined so as to narrow the groove width toward rearward is formed.

7. The electric tool with a dust collector according to claim 6, wherein the engaging portion is an engagement protrusion that runs through a laterally long hole formed on an upper surface of the dust collector and projects upward, and is positioned within the guide groove at the engagement position and biased toward a side on which the engagement recessed portions are formed.

8. The electric tool with a dust collector according to claim 7, wherein the engagement protrusion is projectingly provided on an upper surface of a slider that is provided slidable in a lateral direction within the dust collector and biased toward the side on which the engagement recessed portions are formed.

9. The electric tool with a dust collector according to claim 6, wherein on an inner surface of a side toward which the engaging portion is biased that is on a side of the guide groove into which the engaging portion enters, an inclined surface having a groove width that widens toward the entry is further formed.

10. The electric tool with a dust collector according to claim 5, wherein the engaging portion is an engagement protrusion that runs through a laterally long hole formed on an upper surface of the dust collector and projects upward, and is positioned within the guide groove at the engagement position and biased toward a side on which the engagement recessed portions are formed.

11. The electric tool with a dust collector according to claim 10, wherein the engagement protrusion is projectingly provided on an upper surface of a slider that is provided slidable in a lateral direction within the dust collector and biased toward the side on which the engagement recessed portions are formed.

12. The electric tool with a dust collector according to claim 10, wherein a guide plate is provided upright on the upper surface of the dust collector, and is longitudinally continuous with a rear side of the engagement protrusion in a direction that the engagement protrusion advances into the guide groove when the engagement protrusion is positioned opposite a side on which the engagement protrusion engages with the engagement recessed portion.

13. The electric tool with a dust collector according to claim 5, wherein the sliding engagement of the housing and the dust collector is performed by fitting a rail, which is a tapered surface that is formed on a lower surface of the housing and has left and right surfaces that widen downward, between a pair of left and right guides provided on the upper surface of the dust collector.

14. The electric tool with a dust collector according to claim 13, wherein the guide groove is provided at a center of the rail, and the engaging portion is provided between the guides.

15. The electric tool with a dust collector according to claim 1, wherein the dust collector comprises a detachable dust box.

16. The electric tool with a dust collector according to claim 1, wherein the housing includes on a front lower part a mount unit of the dust collector whose front surface is an inclined surface portion, and the dust collector includes on a rear upper part a mating recessed portion that contacts and fits with the inclined surface portion and a lower surface of the mount unit, whereby the lower surface of the mount unit and an upper surface of the mating recessed portion are in sliding engagement.

17. An electric tool with a dust collector, wherein the dust collector is in sliding engagement with a housing at a predetermined position, comprising:

an engaging portion provided on one of the housing and the dust collector, engageable and disengageable with an engaged portion provided on the other of the housing and the dust collector at an engagement position of the dust collector, and biased in a direction of engagement with the engaged portion, with the dust collector fixed by engaging the engaging portion with the engaged portion; and a second engaging portion provided on the one of the housing and the dust collector, and engageable with the engaged portion at at least one slide position of the dust collector in front of the engagement position, wherein the dust collector is fixed to the housing even at the slide position by engaging the second engaging portion with the engaged portion, and wherein the engaged portion is engaged with the second engaging portion and not the engaging portion in the slide position.

18. The electric tool with a dust collector according to claim 17, wherein a power terminal is provided on each of the housing and the dust collector, with the power terminals separated from each other at the slide position, and electrically connected to each other at the engagement position so as to supply power from the electric tool side to the dust collector.

19. The electric tool with a dust collector according to claim 17, wherein the dust collector comprises a detachable dust box.

20. An electric tool with a dust collector, wherein the dust collector is in sliding engagement with a housing at a predetermined position, comprising:

an engaging portion provided on one of the housing and the dust collector, engageable and disengageable with an engaged portion provided on the other of the housing and the dust collector at an engagement position of the dust collector, and biased in a direction of engagement with the engaged portion, with the dust collector fixed by engaging the engaging portion with the engaged portion; and a second engaging portion provided on one of the housing and the dust collector, engageable and disengageable with a second engaged portion provided on the other of the housing and the dust collector at at least one slide position of the dust collector in front of the engagement position, wherein the dust collector is fixed to the housing even at the slide position by engaging the second engaging portion with the second engaged portion, and wherein the engaging portion is engaged with the engaged portion and not the second engaged portion in the engagement position, and the second engaging portion is engaged with the second engaged portion and not the engaged portion in the slide position.

21. The electric tool with a dust collector according to claim 20, wherein a power terminal is provided on each of the housing and the dust collector, with the power terminals separated from each other at the slide position, and electrically connected to each other at the engagement position so as to supply power from the electric tool side to the dust collector.

22. The electric tool with a dust collector according to claim 20, wherein the dust collector comprises a detachable dust box.

\* \* \* \* \*